United States Patent [19]

Gates et al.

[11] Patent Number: 4,487,213
[45] Date of Patent: Dec. 11, 1984

[54] MASS FLOW CONTROLLER APPARATUS

[75] Inventors: William E. Gates, Sommerset; Wim J. M. Pieters, Morristown, both of N.J.

[73] Assignee: Omicron Technology Corporation, Berkeley Heights, N.J.

[21] Appl. No.: 416,163

[22] Filed: Sep. 9, 1982

[51] Int. Cl.³ .............................................. G01F 1/68
[52] U.S. Cl. ...................................... 137/2; 137/486; 137/487.5; 73/204
[58] Field of Search ................... 137/486, 487.5, 2, 3, 137/4; 73/204, 861.04

[56] References Cited

U.S. PATENT DOCUMENTS

| 3,520,312 | 7/1970 | Ackerman et al. | 137/4 |
| 3,650,151 | 3/1972 | Drexel | 73/861.04 |
| 3,650,505 | 3/1972 | Drexel | 251/11 |
| 3,938,384 | 2/1976 | Blair | 73/204 |

Primary Examiner—A. Michael Chambers
Assistant Examiner—Mark Malkin

[57] ABSTRACT

An apparatus capable of selecting and controlling the mass flow rate of a gas to be substantially constant over extended periods of time at very low flow rates and very low gas partial pressures is disclosed.

6 Claims, 2 Drawing Figures

MASS FLOW CONTROLLER APPARATUS

BACKGROUND OF THE INVENTION

The present invention relates to an improved mass flow controller apparatus which is capable of controlling the mass flow rates of a gas through a conduit to be substantially constant at very low mass flow rates, and very low gas pressures.

A conventional mass flow controller is an electronic device which operates on an adjustable aperature principle and is designed to deliver a fluid such as a gas or liquid through a conduit at a preselected mass flow rate.

The primary components of a typical commercial mass flow controller include a mass flow meter which continuously senses the actual flow rate of a gas and generates an electrical signal proportional to the mass flow rate; a command signal generator which provides an electrical signal proportional to a preselected mass flow rate; a comparator controller which compares the flow meter signal with the command signal, takes the difference between the two signals and uses the difference, if any, to actuate an electrically responsive valve, the valve also constituting a component of the flow controller.

In conventional mass flow meters, heat is applied to a sensing tube conducting the fluid to be measured or is directly applied to a fluid and the temperature of the fluid is measured after the addition. When the upstream temperature is equal to the unheated stream temperature, mass flow can be measured as inversely proportional to the temperature difference for a constant heat addition. A conventional bridge circuit can be used to obtain an electrical signal versus flow function. In another arrangement, heat is applied to a sensing tube and the temperature of the tube measured before and after the heat addition. The upstream temperature of the fluid is influenced by the heating of the tube and is nearly equal to the heater temperature at zero flow. The mass flow of the fluid is proportional to the temperature differential for a constant heat addition. In a third arrangement, heat is applied to a very small wire, probe or thermistor in the fluid stream and the cooling effect of the fluid stream is measured. Cooling of the element is a function of the mass flow. In still another arrangement, heat is applied uniformly to a tube by resistance heating and the cooling effect of the fluid measured with thermocouples to determine mass flow. In yet another arrangement, a pair of temperature sensitive resistance wire coils are wound around the outer surface of a sensing tube through which the fluid flows. The coils are heated and the rate of mass flow of the fluid, which is directly proportional to the temperature differential of the coils, is measured by a bridge circuit.

All of the above arrangements to some extent rely on the generation of a temperature differential induced by a change in the flow rate, e.g. by differential cooling or heating of the fluid, as an indication of the mass flow rate of the fluid. This necessarily requires that the fluid be thermally conductive.

The last sensing arrangement described above, i.e. using a pair of heated sensor coils, is described in Blair, U.S. Pat. No. 3,938,384, and provides increased sensor efficiency due to reduced loss of heat in the sensor elements under conventional operating conditions. In an alternative embodiment disclosed in this patent at FIG. 2 a flow splitting technique is employed to permit measurement of high flow rates. The flow splitting technique employs a bypass tube, which diverts a very small percentage of the fluid in the main tube to flow therein. In accordance with conventional flow splitting techniques, as described in more detail in U.S. Pat. No. 3,851,526, the bypass tube is typically a very thin tubular conduit which is much longer than its diameter to assure laminar flow therein. Consequently, it is not surprising that the bypass tube constituting the sensing conduit of FIG. 2 in the Blair patent is of capillary dimensions (i.e. 0.014 inches at a length of 3.0 inches). The diameter of the main flow conduit 52 of FIG. 2 is not disclosed nor is the diameter of sensing conduit 14 of FIG. 1 therein. Blair also discloses the use of an insulator material of low thermal conductivity, form-fitted around the sensing elements of the sensing conduit. The insulator material reduces the attitude sensitivity of the flow meter. In a further alternative embodiment, Blair suggests, at col. 5, the use of either two constant current sources to replace the bridge resistors of the flow meter bridge circuit, or the use of two bridge resistors of very high resistance relative to the resistance of the sensing elements coupled with a single constant current source in series with the flow meter voltage source, to reduce the influence of ambient temperature changes on the accuracy of the flow meter.

A conventional electrically operated valve is a thermal valve disclosed in U.S. Pat. No. 3,650,505 the disclosure of which is herein incorporated by reference. The thermal valve utilizes heat, generated by an electrical input signal to expand an actuator relative to a reference member. The actuator and reference member are interconnected to one end, and one or the other carries a valve head on its opposite end whereby a differential in expansion caused by a heating element moves the valve head from its seat. Thus the command signal generates heat which is used to open the valve by thermoexpansion. Representative gaseous flow rates typically handled by such thermal valve as disclosed in this patent range from 50 to 3,000 cc/min.

The command signal generator, and comparator controller are all conventional devices.

In commonly assigned U.S. patent application Ser. No. 416,164 filed on an even date herewith by the inventors herein, the disclosure of which is herein incorporated by reference, a method and an analytical device is described for determining the amount of a gas absorbed or desorbed from a solid sample. To conduct this method successfully, the capability is required of continuously controlling the mass flow rate of the gas being administered to, or withdrawn from, the sample to be substantially constant (as hereinafter defined) over extended periods of time of from about 4 to about 20 hours. This method further requires that the mass flow rate be capable of being controlled to be substantially constant when operating over a partial pressure ($P/P_s$) range of the gas of at least between 0.02 to 1, and at very low flow rates of between about 0.2 to about 0.4 ml/min at standard temperature and pressure conditions. The partial pressure of a gas, sometimes referred to as relative pressure, is the pressure (P) of a gas at a given set of temperature and volume conditions divided by the pressure ($P_s$) of the gas at the same conditions at which liquefaction or saturation thereof occurs. Thus, at a partial pressure of about 0.04 the gas exists in a state very near a complete vacuum. Unfortunately, it has been found that conventional mass flow controllers such as those employing the above described components are not capable of sustaining, over extended periods of time, a substantially constant mass flow rate over the entire range of mass flow rates and partial pressures described above. The need therefore arose to develop a device which possessed these capabilities, and the present invention was developed in response to this need.

SUMMARY OF THE INVENTION

It has been discovered that when employing conventional mass flow controllers of the type described above, fluctuations in the mass flow rate of a gas at very low pressures and flow rates can be attributed to the combination of (a) the low thermal conductivity of the gas at very low pressures and flow rates, (b) fluctuations in the temperature of the gas as it enters the mass flow controller, and (c) fluctuations in the temperature of the electronic circuitry of the mass flow controller.

More specifically, at very low gas pressures and flow rates in the sensing conduit of conventional mass flow controllers, the density of the gas can become sufficiently low that it substantially reduces the thermal conductivity of the gas. This in turn disturbs the accuracy of thermal sensing mechanism of such flow meters which require the ability to detect temperature differentials associated with changes in the mass flow rate of the gas. Fluctuations in the temperature of the gas as it enters the sensing conduit of the mass flow controller and fluctuations in the electronic circuitry temperature are caused by fluctuations in ambient room temperature conditions. Fluctuations in the gas temperature generate temperature differentials in the gas which are not proportional to the mass flow rate thereby leading to inaccuracy in the flow meter sensing mechanism. Fluctuations in the temperature of electronic circuitry of the mass flow controller changes the resistance of various circuit components thereby also contributing to error in the sensing and feedback mechanisms responsible for mass flow rate control. In addition, fluctuations in the pressure of the gas are slowly compensated for by conventional mass flow controllers, and also contribute to the inaccuracy of the flow rate.

While each of the aforenoted fluctuations and associated error caused thereby in the mass flow rate may be small over very short periods, they accumulate with time, and in the span of 4 to 20 hours or more they contribute to a sufficiently large deviation in the mass flow rate over such periods that they are not substantially constant as defined herein.

The aforenoted problems are solved by the apparatus of the present invention by employing a capillary tube as the sensing conduit of the flow meter to increase the density of the gas flowing therethrough, and by providing a temperature controlled environment which simultaneously maintains the temperature of the gas entering the sensing conduit constant as well as the temperature of the electronic circuitry of the mass flow controller.

Accordingly in accordance with the present invention there is provided an apparatus capable of selecting and controlling the mass flow rate of gas through a conduit to be substantially constant over a period of at least 4 hours and within a mass flow rate range of from about 0.05 to about 0.5 ml/min at standard temperature and pressure conditions and a gas partial pressure range of from about 0.03 to 1 which comprises:

an enclosure having an exterior surface and defining an inner space;

means for controlling the temperature within said inner space to be substantially constant;

first conduit means defining an input path for directing the flow of a gas from an input port disposed at the exterior surface of said enclosure into said inner space, and an output path in fluid communication with said input path for directing the flow of said gas out of said inner space to an output port at the exterior surface of said enclosure;

elongate sensing conduit means disposed within said enclosure inner space having an interior channel for directing the flow of a gas therethrough and having an input and an output; the input of said sensing conduit being engaged in fluid communication with the input path of said first conduit means and the output of said sensing conduit being engaged in fluid communication with the output path of said first conduit means, the diameter of said sensing conduit interior channel being not greater than 0.2 mm;

flow meter means disposed within said enclosure inner space and in contact with said sensing conduit for sensing a temperature differential induced by change in the mass flow rate of a gas passing from the input to the output of said sensing conduit, and for generating a first output signal representative of said temperature differential and proportional to the mass flow rate of said gas passing through said sensing conduit;

means for generating a reference second output signal proportional to a selected mass flow rate of a gas;

means disposed within said enclosure inner space for comparing the first and second output signals and generating a third output signal representative of the difference of said first and second output signals;

valve means, disposed within said enclosure inner space engaged with said sensing conduit downstream of said flow meter means and with the output path of said first conduit means for controllably disengaging the fluid communication between the sensing conduit and the output path of said first conduit means thereby permitting regulation of the mass flow rate of a gas passing from said sensing conduit to the output path path of said first conduit means, said valve means being actuated by said third output signal;

means for permitting the temperature of a gas passing through the input path of said first conduit means to equilibrate with the substantially constant temperature of said enclosure inner space before said gas enters the sensing conduit means; and means for controlling the pressure of a gas as it enters the input of said sensing conduit means to be substantially constant.

Figure 1:
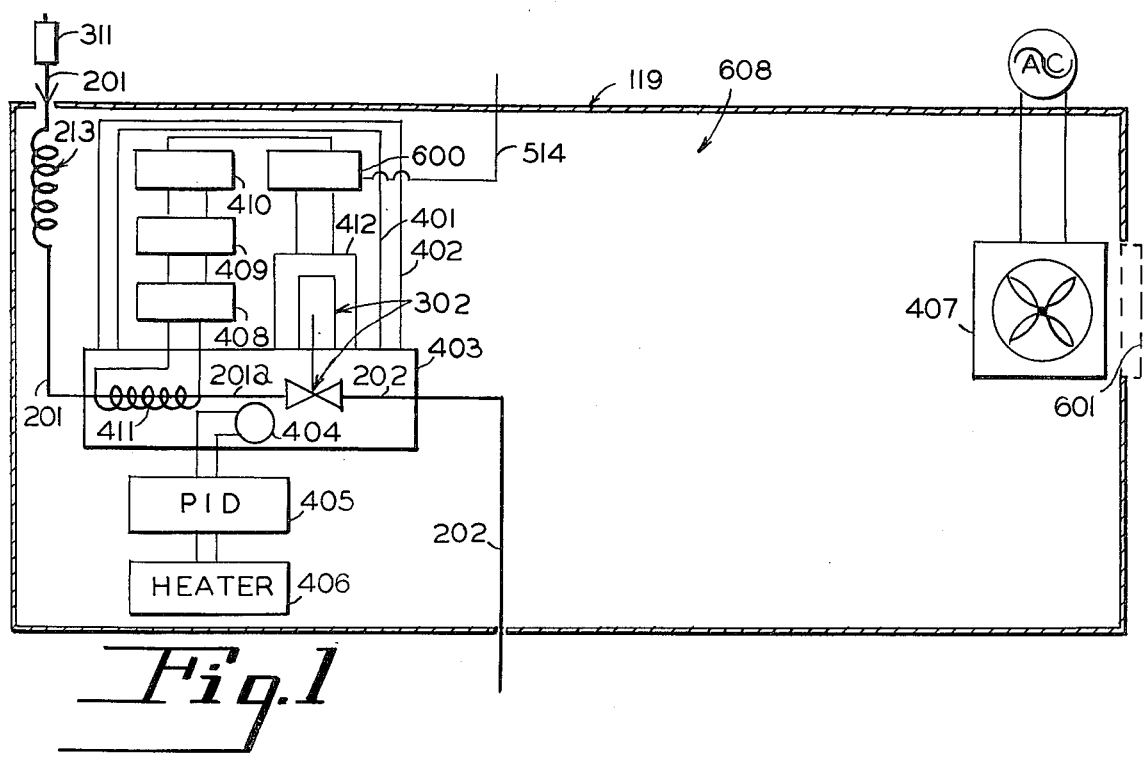
FIG. 1 is a schematic diagram of the component parts of the mass flow controller of the present invention.
Figure 2:
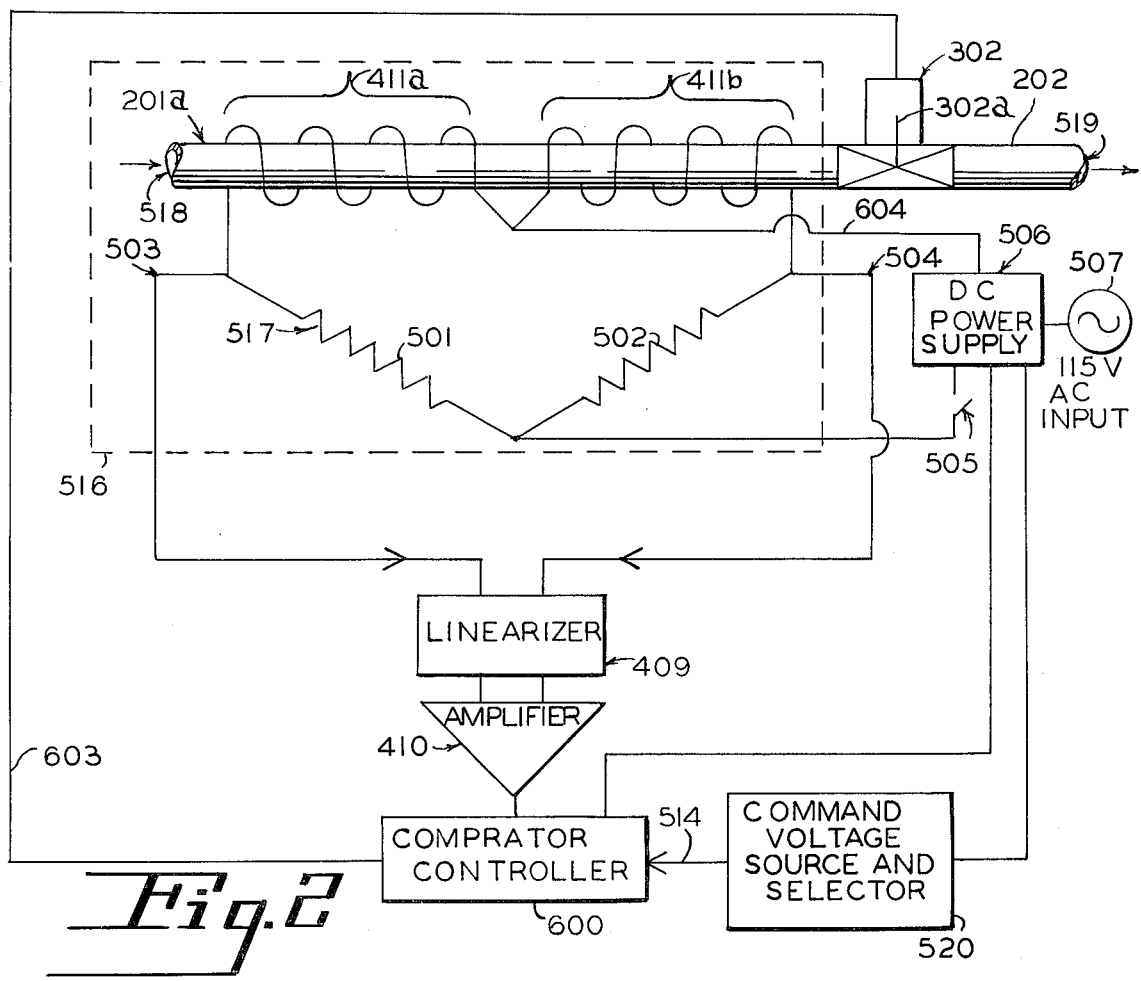
FIG. 2 is a more detailed schematic diagram of the mass flow controller circuit board 401 and flow regulating means within block 403 of FIG. 1.

The diagrammatic showing of FIGS. 1 and 2 omit in certain instances features which those skilled in the art would recognize as desirable in actual apparatus operation. These omissions are made in order to simplify the presentation of the invention and to avoid encumbering it with well understood engineering details. Thus, for example, certain equipment obviously needed for a power supply, for electrical connections to the power supply, etc. are omitted from the diagrammatic representation.

DESCRIPTION OF PREFERRED EMBODIMENTS

The primary components of the mass flow controller of the present invention comprise an enclosure, typically in the form a box to permit substantially constant temperature control of the contents of the enclosure, and the functional components of the mass flow controller.

By "substantially constant" as used in connection with the temperature within said enclosure is meant fluctuations, if any, of typically not greater than ±0.5, preferably not greater than ±0.2, and most preferably not greater than about ±0.1° C. in said temperature. The temperature of the enclosure must be capable of being maintained substantially constant over extended continuous periods of at least about 4, preferably at least about 20 hours, e.g. typically the time during which the mass flow controller will be in continuous operation when employed for the purposes described in the aforenoted commonly assigned patent application for which the mass flow controller described herein can be used.

The term "substantially constant" as applied to the mass flow rate of a gas being controlled by the mass flow controller is defined herein to mean fluctuations, if any, of not greater than ±0.4%, preferably not greater than ±0.2%, and most preferably not greater than ±0.15% in said mass flow rate when the mass flow rate is not less than 0.2 ml/min. When the mass flow rate is between about 0.05 to about 0.19, the term "substantially constant" as applied thereto is defined herein the mean fluctuations, if any, of not greater than about ±1% of said mass flow rate. As the mass flow rate decreases below about 0.05 ml/min the fluctuation therein may increase above 1%.

The mass flow controller described herein is capable of maintaining the flow rate a gas through a conduit to be substantially constant: (a) for a continuous period of at least 4, preferably at least 20 hours; (b) over a partial pressure range of said gas within the sensing conduit described herein of typically from about 0.04 to 1, preferably 0.03 to 1; and most preferably 0.02 to 1; and (c) over a mass flow rate range of said gas at standard gas temperature and pressure conditions of typically from about 0.05 to about 0.7, preferably from about 0.2 to about 0.5, and most preferably from about 0.2 to about 0.4 ml/min. As one skilled in the art would appreciate, the mass flow controller would also be operable under the less stringent conditions encountered by conventional mass flow controllers described in the background herein, such as controlling mass flow rates of 50 ml/min or higher at 1-5 atmospheres of pressure.

The gas flow rates described herein are characterized as mass flow rates because the mass flow controller described hereinafter, responds to thermal conductivity of a gas which is proportional to the mass of the gas. Therefore milliliters per minute can be converted to mass by the Arrhenius equation.

A preferred embodiment of the mass flow controller of the present invention is illustrated collectively in FIGS. 1 and 2 and is best described with reference to these figures.

Referring to FIG. 1, the components of the mass flow controller are housed in a temperature controlled box 119. This box encloses an inner space 608; which is in fluid communication with the atmosphere outside the box via vent 601 and hence is typically filled with air. The box is typically made of a sturdy material such as sheet metal and typically encloses a volume of from about 1500 to about 2500 cm$^3$.

The temperature of the atmosphere within the box preferably is maintained above ambient room temperature to permit active control of the box temperature and thereby maintain such temperature constant. Typically, this temperature is maintained between about 35° and 45° C. (e.g. 39° C.) to avoid damaging the electronics housed within the box and to provide a sufficient temperature gradient between the atmosphere within and without the box that when room air from outside the box is drawn into the same by fan 407, a dynamic temperature equilibrium can be established within the box. Thus, the box temperature selected preferably will be above the temperature which the box would attain, absent a separate heat source, due to the heat given off by the electronics of the mass flow controller. Consequently, when air from the external environment of the box is mixed with air in the box and heated as described herein, the temperature equilibrium established within the box is not disturbed by the mass flow controller electronics.

Temperature control within the box is achieved by the combination of thermistor 404 which preferably is attached to the base of flow controller block 403, Proportional Integral and Derivative (hereinafter PID Controller 405, heating strip 406, and fan 407. Thermistor 404 senses the air temperature within the box over a range of 0° to 100° C. and generates an electrical signal proportional thereto which is sent to the PID controller. The controller (e.g., RFL model 70A) is preset to generate an electrical signal proportional to the difference between a preset box temperature and the actual box temperature. The PID generated electrical signal activates a heater strip 406 (e.g., of the resistive type 300 watt capacity). Thus, the strength of the electrical signal from the PID controller to the heater gets progressively weaker as the actual box temperature approaches the preset temperature and the signal is substantially constant when the actual box temperature equals the preset temperature to compensate for the heat loss to the environment. This provides extremely accurate temperature control. The fan 407 runs continuously during operation of the mass flow controller and circulates air in the box around the heating strip at a high rate of from about 10 to 100 (e.g., 10–75) times the volume of the box or higher per minute.

The fan 407 preferably is located close to vent 601 to draw fresh air into the box 119. The primary components of the mass flow controller which are located within box 119 include (a) stainless steel block 403 adapted to contain sensing conduit 201a which runs along the length thereto until it connects with thermal valve 302, sensing coil 411, and the controllable aperature portion of thermal valve 302 located downstream of sensing coil 411; (b) circuit board 401 which contains the electronic circuitry of the flow controller including, detector bridge circuit 408, linearizer 409, amplifier 410, and comparator controller 600; and (c) thermal valve 302.

Gas is introduced and withdrawn from box 119 and sensing conduit 201a via conduit lines 201 and 202 respectively. Conduit line 201 will typically be connected to a feed gas source. Engaged in series with conduit line 201, is a pressure controller 311 (e.g. SERTA ™ model 204) capable of maintaining the pressure of the gas being fed to sensing Conduit 201a to be substantially constant. By substantially constant as applied to the incoming gas to sensing conduit 201a is defined herein to mean fluctuations, if any, in said pressure of typically not greater than about ±0.35, preferably not greater than about ±0.3, and most preferably not greater than about ±0.2 psi. The pressure in conduit 201 will typically be controlled to be from about 16 to about 25 and preferably from about 16 to about 18 psi. A portion of conduit line 201, typically downstream of pressure controller 311, is adapted to form coil 213 wherein the temperature of gas present therein equilibrates with the temperature of box 119. Coil 213 also assists in stabilizing the pressure in Conduit 201, due to its higher inner diameter relative to Conduit 201. Coil volumes of coil 213 of typically from about 0.5 to about 1.5 cm$^3$ are sufficient for this purpose. Conduit lines 201 and 202 typically are made of stainless steel with an inner diameter of from about 0.05 to about 0.2 inch.

Thus, controlling the temperature of box 119 performs at least 2 important functions, namely, (1) it heats incoming gas in line 201 so that by the time it reaches the flow meter sensing coil 411, it is at the same constant temperature as the box 119 irrespective of fluctuations in the room temperature; and (2) it compensates for the temperature sensitivity of the electronic circuitry present in the circuit board 401, and thermal valve 302.

Sensing conduit 201a starts at the entrance to block 403, passes through sensing coil 411 (which is shown as a single coil in FIG. 1 but is more specifically shown in FIG. 2 as two coils 411a and 411b) and connects with the inlet portion of thermal valve 302. The outlet portion of thermal valve 302 is connected to line 202 by which gas exits block 403 and box 119. The body and electronic circuitry of thermal valve 302 is seated on top of block 403 and encased in plastic housing 412.

The preferred thermal valve is available from Tylan Corporation and is described in detail in U.S. Pat. No. 3,650,505, the disclosure of which is herein incorporated by reference.

Circuit board 401 is encased in plastic housing 402.

The circuitry and operation of the mass flow controller is best described with reference to FIG. 2. Broken line 516 of FIG. 2 depicts the flow meter portion of the flow controller which contains bridge circuit 517 coupled to sensing conduit 201a. The bridge circuit is of conventional design and is formed of a first bridge resistor 501 and a second bridge resistor 502. The bridge circuit further comprises an upstream sensor element 411a and a downstream sensor element 411b. The sensor elements 411a and 411b are wound around the sensing conduit 201a adjacent each other with the upstream sensor element 411a closer to input end 518 of tube 201a and the downstream sensor element 411b closer to the output end 519 of conduit 201a.

The bridge circuit 517 also comprises a D.C. power supply and converter 506, (which operates from AC power source 507) which is connected at one side via line 604 between the junction of the sensor elements 411a and 411b. The other side of the power supply is connected through a switch 505 to the junction of the bridge resistor 501 and 502. Output signals from the bridge circuit are coupled at a first output terminal 503 and a second output terminal 504. The first output terminal 503 is connected to the junction of the upstream sensor element 411a and first bridge resistor 501, and the second output terminal 504 is connected to the junction of the downstream sensor element 411b and the second bridge resistor 502. The upstream sensor element 411a and the downstream sensor element 411b are formed of temperature-sensitive resistance wire which is wound around the outer diameter of the conduit 201a. Such wire can be an iron-nickel alloy, e.g. Balco (a trademark of the Wilbur-Driver Company).

The above circuit design is conventional with the exception that the inner diameter of sensing conduit 201a must be of capillary size of not greater than about 0.2. preferably not greater than 0.05, and most preferably not greater than 0.02 mm, and typically ranges from about 0.005 to about 0.2, preferably from about 0.01 to about 0.1, and most preferably from about 0.01 to about 0.05 mm to achieve substantially constant flow rate. Furthermore, because of the low pressures and flow rates handled by the flow meter, a by-pass tube conventionally employed in mass flow meters should be avoided. As stated above, it has been found that if the inner diameter of sensing conduit 201a is too large, the density of the gas within the tube becomes so low at the pressures and flow rates described herein that the thermal conductivity of the gas drops to the point where the thermal sensing mechanism (described hereinafter) of the flow meter is disrupted and substantially constant flow rate is not attained.

The coupled bridge circuit output signals 503 and 504 are connected to linearizer 409 which electronically provides a linear output voltage as a function of mass flow. This voltage is applied through amplifier 410 to comparator controller 600.

In operation, when the switch 505 is closed, current flows through sensor elements 411a and 411b causing the sensor elements to generate heat, thereby raising the temperature of the tube 201a adjacent the elements. Heating of elements 411a and 411b also raises their resistance. At zero fluid flow through the tube 201a, the temperatures of the sensor elements 411a and 411b are equal and the bridge is therefore balanced, producing a zero output voltage across the terminals 503 and 504. As fluid enters the input end 518 of the tube 201a, heat generated by the elements 411a and 411b is carried by the fluid downstream toward the output end 519 of the tube 201a. Thus, a temperature differential is created between the elements 411a and 411b due to the shifting temperature profile along the tube 201a. As the flow of fluid increases in the tube 201a, the temperature of the upstream element 411a as well as its resistance decreases while simultaneously the temperature of the downstream element 411b, as well as its resistance, increases. The bridge output voltage at terminals 503 and 504 thereby increases in nearly linear proportion to the flow rate. After linearization and amplification of the bridge output voltages of terminals 503 and 504, amplifier 410 applies a single linear voltage which corresponds to the absolute value of the mass flow rate of the gas before the gas reaches thermal valve 302. The voltage from amplifier 410 is applied to comparator controller 600 where it is compared to an external electrical command signal 514 from command signal source and selector 520 which has been preset to correspond to a selected mass flow rate. The comparator controller establishes the difference, if any, between the command signal voltage and the amplifier voltage and utilizes it to power the actuator 302a of thermal valve 302 via line 603. The thermal valve actuator is thus controlled so that it opens more when the comparator control indicates that the mass flow rate is insufficient to balance the command signal, and is closed more when the opposite situation occurs.

In a more preferred alternative embodiment sensor elements 411a and 411b can be combined into a single coil containing a center tap as illustrated in U.S. Pat. No. 3,938,384, the disclosure of which is herein incorporated by reference. By utilizing a single coil with a center tap rather than two separate sensor elements, it is possible to space the coils close together. Thus, heat loss is reduced, equalization between the upstream and downstream sensor elements is facilitated, and the gain of the circuit (temperature change per unit of flow) is greater. In addition, the response of the circuit is faster, and the range of useful flow measurement and the linearity of the circuit is increased.

It is to be understood, that while the mass flow controller has been described with respect to a particular flow meter, other types of flow meters can be used which provide an electrical signal vs. flow function and which operate with a thermoresponsive sensing mechanism, such as described in U.S. Pat. Nos. 3,650,151, 4,056,975; 4,100,801 and the like as described in the background herein. While a thermal valve as described herein is preferred to regulate the flow rate, any other electrically actuated means which possesses the sensitivity and capability of regulating the flow rate to be substantially constant at the conditions of use described herein can be employed.

Furthermore, it is pointed out that the insulating foam block encasing sensor elements as described in U.S. Pat. No. 3,938,384, is preferably avoided because it disturbs the temperature equilibration rate of sensing elements 411a and 411b with the box 119 temperature and is not needed.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An apparatus capable of selecting and controlling the mass flow rate of gas through a conduit to be substantially constant over a period of at least 4 hours and within a mass flow rate range of from about 0.05 to about 0.5 ml/min at standard temperature and pressure conditions and a gas partial pressure range of from about 0.03 to 1 which comprises:

an enclosure having an exterior surface and defining an inner space;

means for controlling the temperature within said inner space to be substantially constant;

first conduit means defining an input path for directing the flow of a gas from an input port disposed at the exterior surface of said enclosure into said inner space, and an output path in fluid communication with said input path for directing the flow of said gas out of said inner space to an output port at the exterior surface of said enclosure;

elongate sensing conduit means disposed within said enclosure inner space having an interior channel for directing the flow of a gas therethrough and having an input and an output; the input of said sensing conduit being engaged in fluid communication with the input path of said first conduit means and the output of said sensing conduit being engaged in fluid communication with the output path of said first conduit means, the diameter of said sensing conduit interior channel being not greater than 0.2 mm;

flow meter means disposed within said enclosure inner space and in contact with said sensing conduit for sensing a temperature differential induced by change in the mass flow rate of a gas passing from the input to the output of said sensing conduit, and for generating a first output signal representative of said temperature differential and proportional to the mass flow rate of said gas passing through said sensing conduit;

means for generating a reference second output signal proportional to a selected mass flow rate of a gas;

means disposed within said enclosure inner space for comparing the first and second output signals and generating a third output signal representative of the difference of said first and second output signals;

valve means, disposed within said enclosure inner space engaged with said sensing conduit downstream of said flow meter means and with the output path of said first conduit means for controllably disengaging the fluid communication between the sensing conduit and the output path of said first conduit means thereby permitting regulation of the mass flow rate of a gas passing from said sensing conduit to the output path of said first conduit means, said valve means being actuated by said third output signal;

means for permitting the temperature of a gas passing through the input path of said first conduit means to equilibrate with the substantially constant temperature of said enclosure inner space before said gas enters the sensing conduit means;

means for controlling the pressure of a gas as it enters the input of said sensing conduit means to be substantially constant.

2. The apparatus of claim 1 wherein said flow meter means comprises:

a plurality of self-heating sensor element coils having adjacent ends positioned along the flow path of a gas flowing through said sensing conduit means externally of said sensing conduit means, one of said sensor elements being closer to one end of said sensing conduit means than another of said sensor elements, said sensor element coils being formed of temperature sensitive resistant wire wound around the outer surface of said sensing conduit means and sensing their own temperature as modified by changes in the mass flow rate of said gas;

means for heating said sensor elements;

means for detecting the temperature differential of said sensor elements induced by said mass flow rate change; and means for generating said first output signal.

3. The apparatus of claim 1 wherein the diameter of the interior channel of the sensing conduit is not greater than 0.05 mm.

4. The apparatus of claim 1 wherein said means for controlling and selecting the temperature of said enclosure inner space comprises:

vent means disposed within said enclosure for engaging said inner space in fluid communication with the atmosphere exterior to said enclosure, thereby permitting the enclosure inner space to receive air from or discharge air to the environment external to said enclosure;

means for sensing the temperature of the atmosphere within said enclosure inner space and for generating a first temperature output signal proportional to said temperature;

means for generating a second temperature output signal proportional to the difference between said first output signal and a reference signal representative of a selected temperature;

means for heating the atmosphere within said inner space actuated by said second output signal; and means for continuously circulating air from external to said enclosure uniformly within said inner space at a rate of from about 10 to about 75 times the volume of said inner space per minute.

5. The apparatus of claim 1 wherein the input path of said first conduit means is adapted to form a coil for permitting the temperature of gas passing therethrough to equilibrate with the temperature of said inner space.

6. The apparatus of claim 1 wherein said valve means is a thermal valve responsive to thermoexpansion of an actuator relative to a reference number.

* * * * *